Dec. 20, 1955　　　　R. DAWSON　　　　2,727,545
HACKSAW WITH BLADE-LIKE SUPPORT
Filed May 1, 1953　　　　　　　　　　　　　2 Sheets-Sheet 1
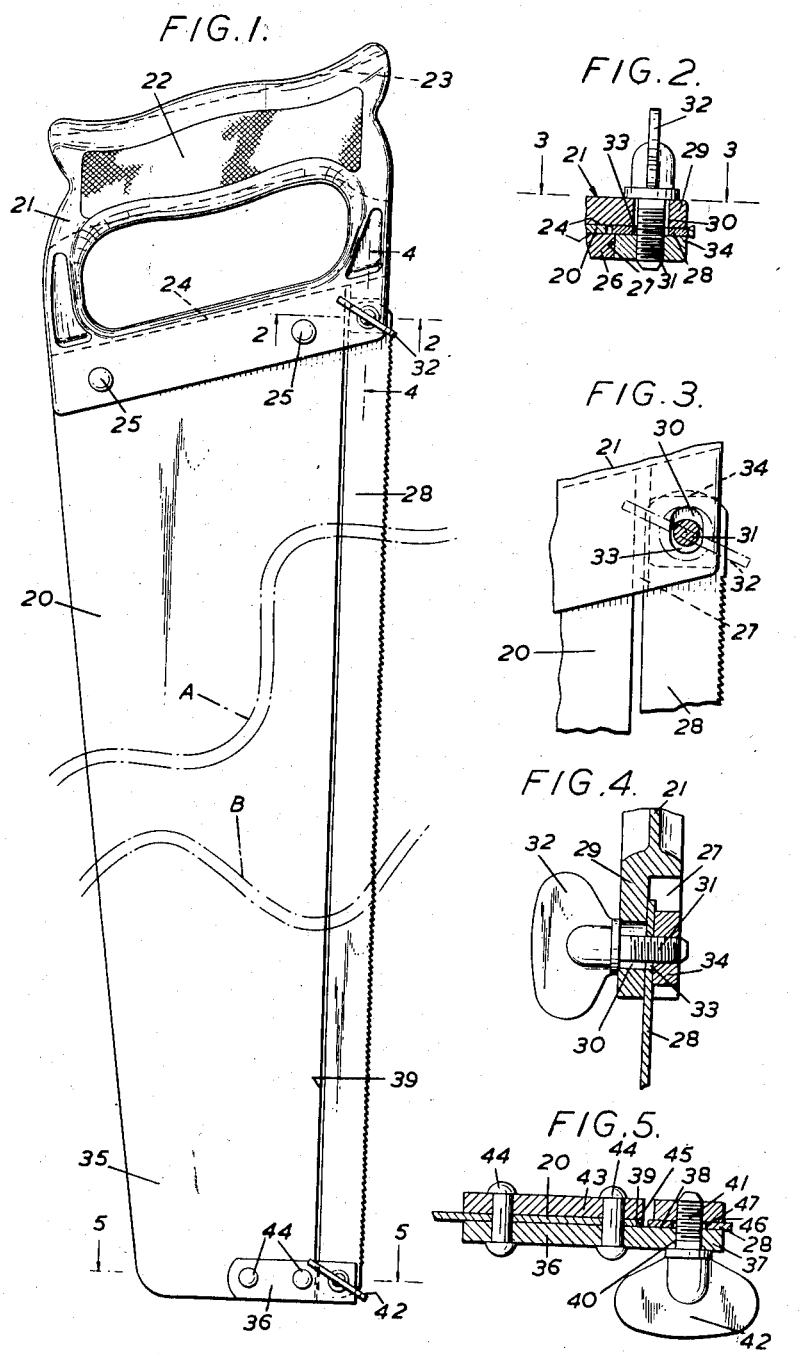
Inventor
Rupert Dawson
By Watson Cole, Grindle
 & Watson
Attorneys Dec. 20, 1955
R. DAWSON
2,727,545
HACKSAW WITH BLADE-LIKE SUPPORT
Filed May 1, 1953
2 Sheets-Sheet 2
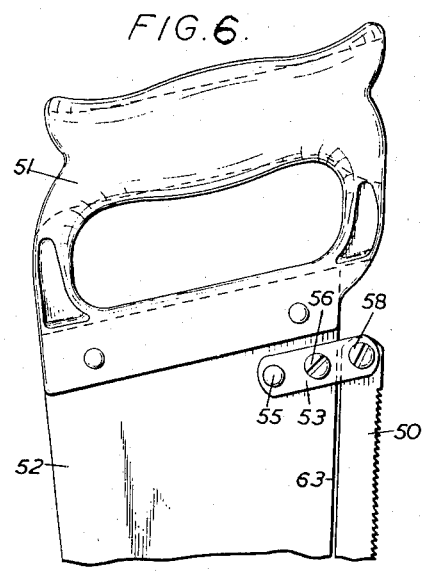
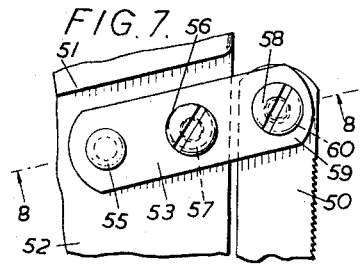
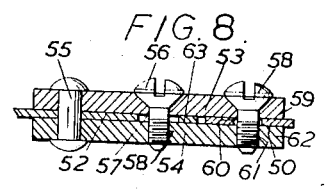
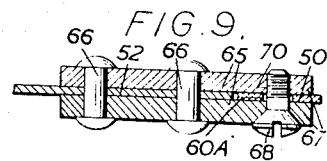
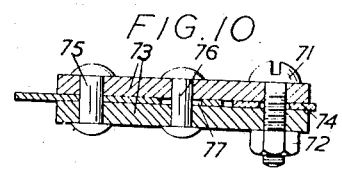
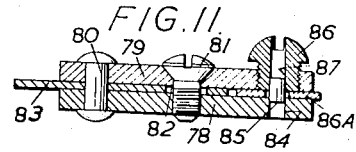
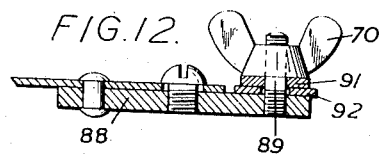
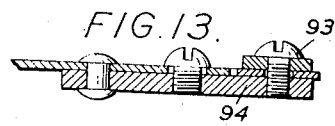
Inventor
Rupert Dawson
By Watson, Cole
Grindle & Watson
Attorneys

United States Patent Office 2,727,545
Patented Dec. 20, 1955

2,727,545

HACKSAW WITH BLADE-LIKE SUPPORT

Rupert Dawson, Sheffield, England, assignor to James Neill & Company (Sheffield) Limited, Sheffield, England Application May 1, 1953, Serial No. 352,451

Claims priority, application Great Britain November 20, 1952

6 Claims. (Cl. 145—31)

This invention relates to hacksaws of the type in which a replaceable cutting blade is mounted along one edge of a wide back-less blade-like support by means of pins passing through the surfaces of members projecting beyond the edge of the support at its ends.

The object of the invention is to provide a hacksaw of this type in which the cutting blade may be readily mounted and firmly clamped to the projecting surfaces and to the blade-like support, and in which moreover the cutting blade may be readily applied to the support without tension or compression, so as to flex equally with the support.

With this object in view, the invention comprises constructional features as described with reference to the accompanying drawings and defined in the annexed claims.

In the drawings:

Figure 1 is a side elevation of one form of saw;

Figure 2 is an enlarged fragmentary section on the line 2—2 of Figure 1;

Figure 3 is a part-sectional elevation on the line 3—3 of Figure 2;

Figure 4 is an enlarged fragmentary section on the line 4—4 of Figure 1;

Figure 5 is an enlarged fragmentary section on the line 5—5 of Figure 1;

Figure 6 is a foreshortened side elevation of another form of saw;

Figure 7 is an enlarged fragmentary detail of Figure 6;

Figure 8 is a section on the line 8—8 of Figure 7;

Figure 9 is an enlarged fragmentary section on the line 9—9 of Figure 6;

Figures 10 to 13 correspond to Figure 8, and show various modifications.

In Figure 1, a wide blade-like support 20 is provided with a handle 21 of the general type used on hand-saws, i. e., of the closed-loop die-cast type with a hand grip 22 that is hollowed at 23 for lightness. The handle is slotted at 24 for the wide support 20 to be secured to it by rivets 25. The slot is longer than the width of the support, and one wall 26 of the slot has a piece removed at 27 (Figures 2-4) to allow one end of a hacksaw blade 28 to be applied to the inner surface of the other wall 29 thus left exposed beyond the edge of the support 20. The other wall 29 has a short lengthwise slot 30 through which passes the stem 31 of a wingscrew 32, which, after passing through the hole 33 in that end of the hacksaw blade, screws into a square nut 34 fitting the space 27. The square nut 34 has only limited freedom to turn in the space 27 when the screw 32 is turned. The head of the screw 32 is omitted from Figure 3, but the position of its wing is indicated in broken lines.

The thickness of the wide support 20 approximates to that of blades 28 to be used with the saw. As with a hand-saw blade, it need only be thick enough to withstand the cutting thrust, and, as indicated above, this may permit it to flex somewhat. The support 20 tapers somewhat to its end 35 remote from the handle 21. At that end (Figure 5), a strip 36 riveted to one side projects at 37 to expose a face 38 beyond the edge 39 of the support 20 pierced with a round hole 40 to receive the stem 41 of a wing screw 42. At the other side of the support 20, another strip 43 is also riveted (using the same rivets 44) to provide at one end an abutting edge 45 to limit the rotation of a square nut 46 into which the stem 41 screws after passing through the hole 47 in that end of the blade 28.

First, this end of the blade 28 is clamped laterally to the strip 36 by the screw 42 and nut 46, after the blade has been drawn by finger tension only to its full extent in the direction of the handle 21 to cause the stem 41 to bear on the far side of the hole 47. The handle end of the blade 28 is then clamped laterally to the surface of the wall 29 by the screw 32 and the nut 34, the slot 30 through which the stem 31 passes allowing the stem to enter the hole 33 at that end, despite minor variation in spacing, so that after clamping, the blade 28 is not subjected to tension or compression, but is able to flex with the wide support 20 to the same degree.

When the saw is in use, the clamp at the far end 35 forms the only projection out of the common plane of the support 20 and the blade 28 and that projection lies at the underside of the sheet being cut, and this enables the saw to be brought to different inclinations with respect to the work, as is particularly advantageous in cutting corrugated sheet, as indicated at A and B. At A, the blade 28 is cutting one side of a corrugation; and at B it is cutting another side; but in both cases it makes a short cut through the material, which is conducive to very rapid cutting. Substantially the whole toothed edge of the blade 28 is available for the cutting stroke, although in practice the most rapid cutting may be effected by using the part of the blade nearer the handle 21, where the thrust can be concentrated by the user.

It is preferable to use a blade 28 of a width that brings its back edge 48 close to the edge 39 of the wide support 20; but narrower blades can still be used, and in general some slight latitude is provided in the positions for the screwed stems 31, 41 in relation to the edge 39 to allow for variations in width or straightness of the maximum width of standard hacksaw blade 28 that may be accommodated.

In Figure 6, one end of a replaceable blade 50 is clamped laterally near the handle 51 of a wide support 52 between strips 53, 54 riveted at 55 to the support 52 and also secured by a screw 56 passing from the strip 53 through a clearance hole 57 in the support 52 into a tapped hole 58 in the strip 54. The stem of a similar screw 58 passes through the projecting end 59 of the strip 53, through the hole 60 in the end of the blade 50, and into a tapped hole 61 in the projecting end 62 of the strip 54. The screw 58 is so located as to provide latitude from the edge 63 of the support 52 for variations in the width of blades 50 capable of being accommodated in the saw.

At the end 64 of the tapering support 52 remote from the handle 51, the other end of the blade 50 is clamped laterally between strips 65, secured by rivets 66 and projecting at 67 for the stem of a screw 68 to pass through one strip and the hole 69 in the blade 50 into a tapped hole 70 in the other strip. With that end of the blade 50 first inserted in its clamp and the screw 58 of the other clamp passed through the hole 60A in the other end of the blade, the blade 50 is drawn by finger tension in the direction of the handle by rocking the strips 53, 54 about the rivet 55 (which the clearance hole 57 for the screw 56 permits) and this carries the stem of the screw 58 against the edge of the blade-hole 60 nearer to the end of the blade, and causes the stem 70 of the screw 68 at the far end to bear against the farther side of the hole 60. The screws 56, 58 are then tightened to secure the clamp laterally to the support 52 and to grip the blade 50 laterally to the clamp, and the screw 68 is also tightened. The blade 50 lying alongside the support 52 is free to flex with it to the same degree.

Blades 28, 50 of different pitches of tooth or different qualities of steel may be used, in accordance with the nature of the material to be cut. Two-edged blades may also be used, for reversal when one edge is worn out.

In either construction, the wide support may be provided with clamps at both its edges, so that two replaceable blades—of the same or different types—may be secured to it, the saw then being reversible. As a further alternative, the farther longitudinal edge of the wide support itself may be toothed, for reversible use as an ordinary saw, provided the set of those teeth is small enough to enable them to pass into the cut made by the hacksaw blade in the normal use of the saw.

Figures 10 to 13 show various alternatives to the hand-end clamp of Figure 6.

In Figure 10, a screw 71 and nut 72 enable strips 73 to be tightened laterally on to a replaceable blade 74, the strips rocking about a rivet 75 and further secured by a rivet 76 passing through a clearance hole in the wide support 77.

In Figure 11, strips 78, 79 are riveted at 80 and further secured by a screw 81 passing through a clearance hole 82 in the wide support 83. A hole 84 in the strip 78 receives the end of a pin 85 carried by a clamping screw 86 for which the strip 79 is tapped. The pin 85 is replaceable (since it is subject to wear by contact with the replaceable blade 86A; for this purpose, it is a press fit in a hole 87 in the screw 86.

In Figure 12, a single projecting strip 88 carries a stem 89 for a wing-nut 90 and a washer 91 by means of which the replaceable blade 92 is clamped.

In Figure 13, the wing-nut and stem of Figure 12 are replaced by a screw 93 entering a tapped hole in the strip 94.

What I claim is:

1. A hacksaw comprising a wide back-less blade-like support, a handle secured to the support, members with surfaces projecting beyond one edge of the support at each end of the support, pins at the surfaces for the mounting of a replaceable cutting blade, at least one projecting member at one end of the support being in permanent pivotal engagement with the support, clamping means to secure that member laterally to the support, there being a clearance hole for the passage of the clamping means to permit the member to be pivoted prior to clamping, and separate clamping means to secure the cutting blade solely by lateral pressure to the projecting portion of that member.

2. A hacksaw as in claim 1, wherein the separate clamping means comprises a screw, the stem of which passes through a hole in the projecting portion of the member and provides the pin on which the cutting blade is mounted.

3. A hacksaw comprising a wide backless blade-like support, a handle secured to the support, strips projecting beyond one edge of the support at each end of the support, pins at the projecting strips for the mounting of a replaceable cutting blade, there being at at least one end of the support a pair of strips both projecting beyond the edge of the support, a pivot permanently engaging the other ends of those strips to the support and the support lying between the strips, a clamping screw passing through the strips and the support intermediately of the pivot and the edge of the support, the support having a clearance hole for the stem of the screw, and a second clamping screw passing through the projecting portions of the strips, its stem providing a pin for the mounting of one end of the cutting blade, the first clamping screw providing for lateral clamping of the strips to the support after pivoting of the support to the full extent permitted by the cutting blade, and the second clamping screw providing for lateral clamping of the strips to the cutting blade with the strips pivoted to that full extent.

4. A hacksaw as in claim 3, wherein one of the pair of strips is threaded to receive the screwed stems of the clamping screws that have passed through the other strip and the interposed support and cutting blade respectively.

5. A hacksaw comprising a wide backless blade-like support, a handle secured to the support, members with surfaces projecting beyond one edge of the support at each end of the support, pins at the surfaces for the mounting of a replaceable cutting blade, at least one projecting member at each end of the support being in permanent engagement with and clamped laterally to the support, clamping means to secure the cutting blade detachably to the projecting portions of the members by lateral pressure, and a clearance hole for one of the clamping means to permit the replaceable blade to be drawn into alignment with the support prior to final clamping and then held in alignment with the support when it is clamped by the lateral pressure to the projecting members.

6. A hacksaw comprising a wide backless blade-like support, a handle slotted to receive one end of the support, rivets securing the support to the handle, at least one strip in permanent rigid engagement with the far end of the support from the handle and projecting beyond the edge of the support, with a clamping screw passing through the projecting strip and providing by its stem a pin to mount one end of a replaceable cutting blade, which the screw clamps laterally to the strip, one side of the handle slot projecting beyond the edge of the handle-end of the support to provide a mounting surface for the other end of the cutting blade, a clearance hole in that mounting surface, a clamping screw passing through the mounting surface and providing by its stem a pin for the mounting of that other end of the cutting blade, which the screw clamps laterally to the mounting surface, and a nut for the stem of the screw, the clearance hole providing for the cutting blade to be drawn to its full extent towards the handle before its handle-end is clamped by the screw and the nut to the mounting surface.

References Cited in the file of this patent

UNITED STATES PATENTS

| | | |
|---|---|---|
| 417,539 | Bush | Dec. 17, 1889 |
| 786,766 | Hunt | Apr. 4, 1905 |
| 2,375,651 | Henry | May 8, 1945 |
| 2,403,027 | Schoultz | July 2, 1946 |